(12) United States Patent
Zhang et al.

(10) Patent No.: US 10,088,700 B2
(45) Date of Patent: Oct. 2, 2018

(54) DOUBLE-SIDE DISPLAY DEVICE AND FIXING STRUCTURE FOR BACKLIGHT MODULE OF THE SAME

(71) Applicant: Shenzhen China Star Optoelectronics Technology Co., Ltd., Shenzhen, Guangdong (CN)

(72) Inventors: Zuwei Zhang, Guangdong (CN); Guofu Tang, Guangdong (CN); Weifeng Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 229 days.

(21) Appl. No.: 15/031,743

(22) PCT Filed: Apr. 8, 2016

(86) PCT No.: PCT/CN2016/078788
§ 371 (c)(1),
(2) Date: Apr. 24, 2016

(87) PCT Pub. No.: WO2017/166329
PCT Pub. Date: Oct. 5, 2017

(65) Prior Publication Data
US 2018/0088391 A1    Mar. 29, 2018

(30) Foreign Application Priority Data
Mar. 28, 2016 (CN) .......................... 2016 1 0181749

(51) Int. Cl.
*G02F 1/1333* (2006.01)
*F21V 8/00* (2006.01)

(52) U.S. Cl.
CPC ....... *G02F 1/133308* (2013.01); *G02B 6/009* (2013.01); *G02B 6/0088* (2013.01);
(Continued)

(58) Field of Classification Search
CPC .... G02B 6/0088; G02B 6/009; G02B 6/0091; G02B 6/0073; G02B 6/00; G02B 6/0043;
(Continued)

(56) References Cited

U.S. PATENT DOCUMENTS 8,773,614 B2 * 7/2014 Han ...................... G02F 1/1333
349/62
2013/0258246 A1 10/2013 Kim et al.
(Continued)

FOREIGN PATENT DOCUMENTS

| CN | 101377589 A | 3/2009 |
| CN | 201487746 U | 5/2010 |
| CN | 201606759 U | 10/2010 |

*Primary Examiner* — Thoi Duong
(74) *Attorney, Agent, or Firm* — Andrew C. Cheng (57) ABSTRACT

A double-side display device and a fixing structure of a backlight module of the same. The fixing structure includes: a first fixing part, a second fixing part, and a third fixing part, wherein the first fixing part includes a first main body portion, a first carrying portion and a first connection portion formed integrally; the second fixing part includes a second connection portion and a second carrying portion formed integrally, the second connection portion is detachably connected with the first connection portion; and the third fixing part includes a third main body portion, a third carrying portion and a third connection portion formed integrally, wherein the third connection portion is used for fixing and connecting with the first fixing part. The fixing structure for the backlight module realize the fixing to the backlight module through multiple fixing parts which is simple in structure, and the assembly process is simple.

15 Claims, 5 Drawing Sheets

(52) U.S. Cl.
CPC ............ *G02F 2001/133317* (2013.01); *G02F 2001/133328* (2013.01); *G02F 2001/133342* (2013.01)

(58) Field of Classification Search
CPC .. G02B 6/0093; G02B 6/0023; G02B 6/0078; G02B 6/0081; G02F 1/133308; G02F 1/133615; G02F 1/133608; G02F 1/1333; G02F 1/133603; G02F 1/1335; G02F 1/133524; G02F 1/133504; G02F 1/1336; G02F 1/133602; G02F 2001/133317; G02F 2001/13332; G02F 2001/133314; G02F 2001/133322; G02F 2001/133325; G02F 2001/133328; G02F 2201/46; G02F 2201/465; G02F 2201/503; H04N 5/64; H04N 9/3141; H04N 3/127; H05K 2201/10136
USPC ...... 349/58, 65, 62; 362/632, 633, 634, 600, 362/612, 97.1, 97.2
See application file for complete search history.

(56) References Cited

U.S. PATENT DOCUMENTS

| | | | |
|---|---|---|---|
| 2014/0055705 A1* | 2/2014 | Yu | G02F 1/1333 349/58 |
| 2015/0205037 A1 | 7/2015 | Hsiao et al. | |

* cited by examiner

DOUBLE-SIDE DISPLAY DEVICE AND FIXING STRUCTURE FOR BACKLIGHT MODULE OF THE SAME

BACKGROUND OF THE INVENTION

1. Field of the Invention

The present invention relates to a technology field of a double-side display device assembly structure, and more particularly to a double-side display device and a fixing structure for a backlight module of the same.

2. Description of Related Art

Along with the development of the display technology, comparing to the conventional home display, the commercial display is prior in application. Currently, in common public places, a double-side display way is achieved by a combination of two independent display devices in order to achieve a double-side information pushing function. The double-side display way combined by the above method is very heavy, and is not conducive for a space utilization. From a development trend of thinning of the traditional home display, the commercial display must require a thinning design to meet the application requirement. Because the liquid crystal display requires a backlight module, because a liquid crystal display requires a backlight module, solving a thickness of the backlight module is to solve a thickness of entire liquid crystal module.

SUMMARY OF THE INVENTION

The present embodiment provides a double-side display device and a fixing structure for a backlight module of the same in order to solve the too heavy problem of the double-side display device in the conventional art.

In order to solve the above problem, the embodiment of the present invention provides a double-side display device and a fixing structure for a backlight module of the same. The fixing structure includes: a first fixing part including a first main body portion, a first carrying portion and a first connection portion which are formed integrally; a second fixing part including a second connection portion and a second carrying portion which are formed integrally, the second connection portion is detachably connected with the first connection portion; and a third fixing part including a third main body portion, a third carrying portion and a third connection portion which are formed integrally, wherein the third connection portion is used for fixing and connecting with the first fixing part; wherein, the first fixing part and the second fixing part are connected to form an integral fixing unit, the integral fixing unit cooperates with the third fixing part to realize the fixing for a backlight module, and the first carrying portion, the second carrying portion, the third carrying portion are used for carrying the light guide plate of the backlight module respectively at different locations.

According to a preferred embodiment of the present invention, the fixing structure further includes a fourth fixing part including a fourth main portion, a fourth carrying portion and a fourth connection portion which are formed integrally; the fourth connection portion is used for fixing and connecting with the first fixing part or the third fixing part; the fourth fixing part cooperates with the integral fixing unit and the third fixing part to realize the fixing for the backlight module.

According to a preferred embodiment of the present invention, the first carrying portion includes a first carrying surface and a first supporting plate extended out from and perpendicular to a terminal of the first carrying surface; the first carrying surface is used for attaching with a backlight light bar, one side of the first supporting plate closed to the first carrying surface is used for carrying a light guide plate, and the other side of the first supporting plate is used for supporting a liquid crystal module.

According to a preferred embodiment of the present invention, the side of the first supporting plate used for supporting the liquid crystal module is provided with a first slot, and the first slot is used for attaching with a slide-preventing tape of the liquid crystal module.

According to a preferred embodiment of the present invention, the first connection portion is a screw hole provided on the first main body portion; the second connection portion includes a second through hole, a screw bolt passes through the second through hole and cooperates with the screw hole on the first connection portion such that the first connection portion and the second connection portion are fixed and connected.

According to a preferred embodiment of the present invention, the first connection portion of the first fixing part is an L-shaped connection slot provided at the first main body portion, and a structure of the second connection portion matches with the L-shaped connection slot, the second connection portion slides inside the L-shaped connection slot in order to realize a detachable connection between the second connection portion and the first connection portion.

According to a preferred embodiment of the present invention, one side of the second carrying portion opposite to the first carrying portion is used for carrying the light guide plate, the other side of the second fixing part is provided with a second slot, the second slot is used for attaching with the slide-preventing tape for the liquid crystal module.

According to a preferred embodiment of the present invention, the third carrying portion includes two third supporting plates extended out from a same side surface of the third main body portion; the two third supporting plates and the third main body portion commonly form a third U-shaped fixing slot for the light guide plate; outer sides of the two third supporting plates are respectively provided with third slots; each third slot is used for attaching with the slide-preventing tape for the liquid crystal module.

According to a preferred embodiment of the present invention, the fourth carrying portion includes two fourth supporting plates extended out from a same side surface of the fourth main body portion; the two fourth supporting plates and the fourth main body portion commonly form a fourth U-shaped fixing slot for the light guide plate; outer sides of the two fourth supporting plates are respectively provided with fourth slots; each fourth slot is used for attaching with the slide-preventing tape for the liquid crystal module; the fourth connection portion is a through hole that penetrates through the fourth main body portion and is communicated with the fourth U-shaped fixing slot.

In order to solve the above technology problem, the present invention also provides a double-side display device, wherein the double-side display device includes a liquid crystal module, a backlight module, an optical film group and a fixing structure for the backlight module; the optical film group is attached at two sides of a light guide plate of the backlight module, a periphery of the light guide plate is fixed through the fixing structure, outer sides of carrying portions of the fixing structure are connected with and supporting the liquid crystal module Comparing to the conventional art, the present invention provides a double-side display device and a fixing structure of a backlight module of the same, the fixing to the backlight module can be realized through multiple fixing parts which is simple in structure, and the assembly process is simple; then, through disposing optical film group and the liquid crystal module respectively at two sides of the backlight module, the double-side display device which is light and thin in volume is formed such that the double-side display device can be thinning. Besides, the different parts of the fixing structure are made partially utilizing a same mold; the production cost of the fixing parts can be decreased.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Embodiment 1

Figure 1:
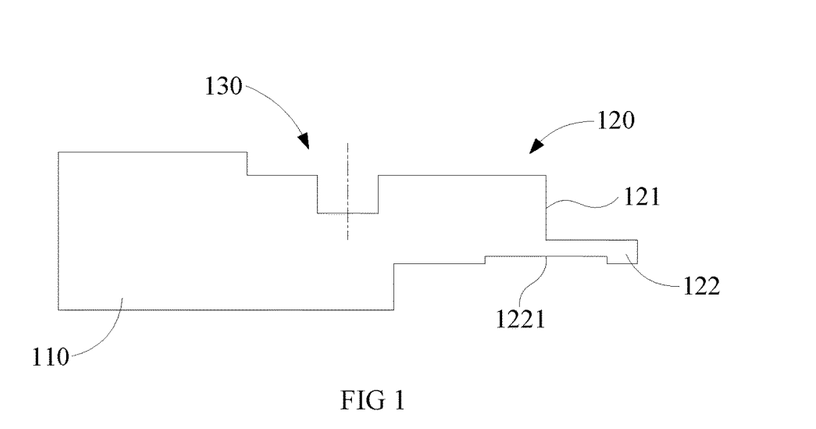
FIG. 1 is a schematic side view of a first fixing part of a first embodiment of a fixing structure of a backlight module of a double-side display device of the present invention.
Figure 2:
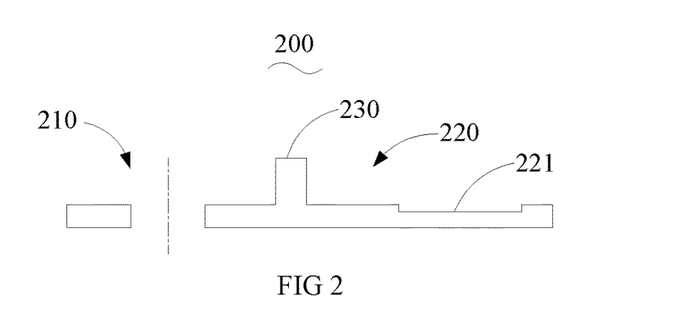
FIG. 2 is a schematic side view of a second fixing part of the first embodiment of the fixing structure of the backlight module of the double-side display device of the present invention.
Figure 3:
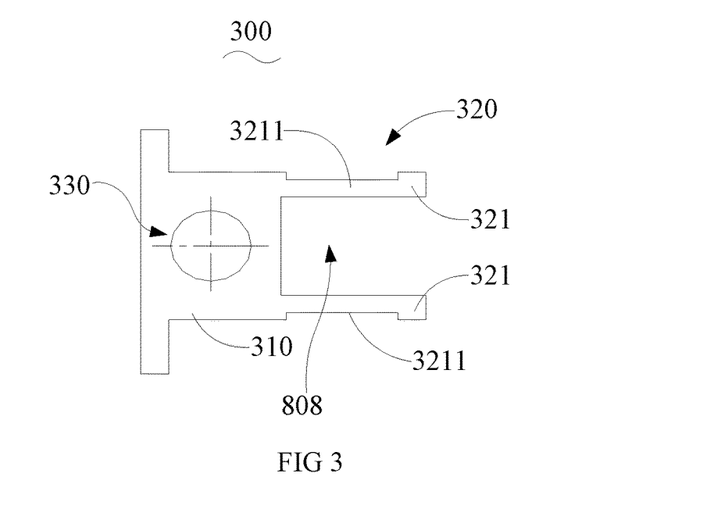
FIG. 3 is a schematic side view of a third fixing part of the first embodiment of the fixing structure of the backlight module of the double-side display device of the present invention.
Figure 4:
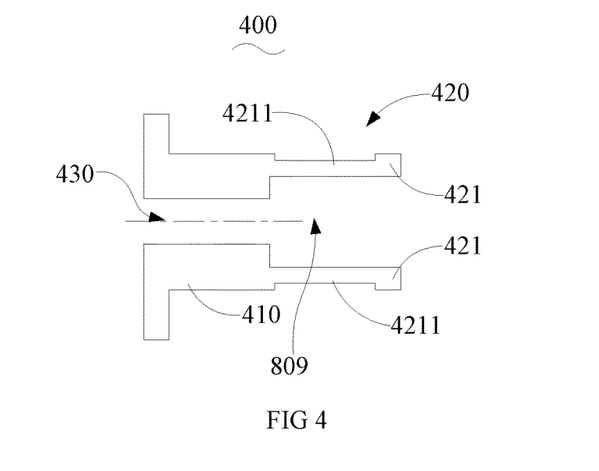
FIG. 4 is a schematic side view of a fourth fixing part of the first embodiment of the fixing structure of the backlight module of the double-side display device of the present invention.
Figure 5:
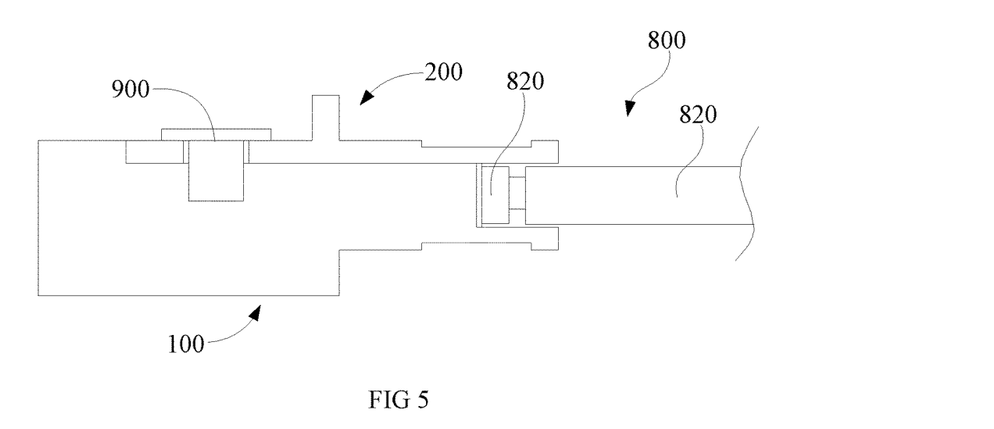
FIG. 5 is a schematic side view of an entire fixing unit formed by connecting the first fixing part and the second fixing part in the first embodiment of the fixing structure of the backlight module of the double-side display device of the present invention.

With combined reference to FIG. 1 to FIG. 5, wherein FIG. 1 is a schematic side view of a first fixing part of a first embodiment of a fixing structure of a backlight module of a double-side display device of the present invention; FIG. 2 is a schematic side view of a second fixing part of the first embodiment of the fixing structure of the backlight module of the double-side display device of the present invention; FIG. 3 is a schematic side view of a third fixing part of the first embodiment of the fixing structure of the backlight module of the double-side display device of the present invention; FIG. 4 is a schematic side view of a fourth fixing part of the first embodiment of the fixing structure of the backlight module of the double-side display device of the present invention; and FIG. 5 is a schematic side view of an entire fixing unit formed by connecting the first fixing part and the second fixing part in the first embodiment of the fixing structure of the backlight module of the double-side display device of the present invention. The fixing structure in the first embodiment includes but not limited to following parts: a first fixing part 100, a second fixing part 200, a third fixing part 300 and a fourth fixing part 400.

Specifically, the first fixing part 100 is strip-shaped, including a first main body portion 110, a first carrying portion 120 and a first connection portion 130 which are formed integrally. The structure of the first fixing part 100 has a heat dissipation function and a fixing function at the same time.

The first carrying portion 120 further includes a first carrying surface 121 and a first supporting plate 122 extended out from and perpendicular to a terminal of the first carrying surface 121. The first carrying surface 121 is used for attaching with a backlight light bar 810, one side of the first supporting plate 122 closed to the first carrying surface 121 is used for carrying a light guide plate 820, and the other side of the first supporting plate 122 is used for supporting a liquid crystal module 700. An optical film group 600 is attached to two sides of the light guide plate 820.

The side of the first supporting plate 122 used for carrying the liquid crystal module 700 is also provided with a first slot 1221, the first slot 1221 is used for attaching with a slide-preventing tape 710.

The first connection portion 130 is a screw hole provided on the first main body portion 110; with combined reference to FIG. 2 and FIG. 5, a second connection portion 210 includes a second through hole. A screw bolt 900 passes through the second through hole and cooperates with the screw hole on the first connection portion 130 such that the first connection portion 130 and the second connection portion 210 are fixed and connected in order to realize the connection of the first fixing part 100 and the second fixing part 200. Wherein, the first fixing part 100 and the second fixing part 200 are connected to form an integral fixing unit.

Figure 6:
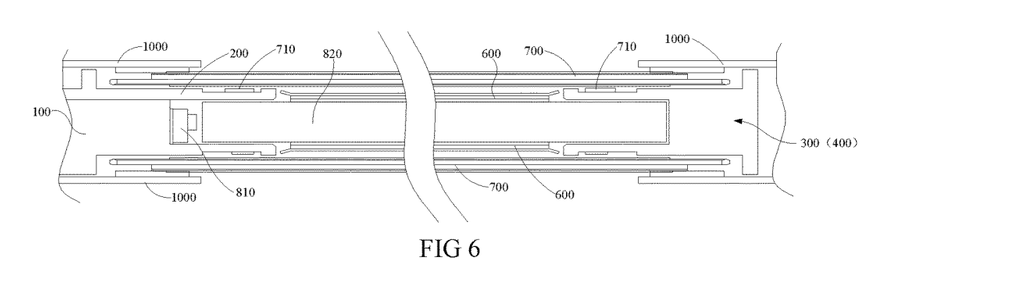
FIG. 6 is schematic side view of an assembly structure of the fixing structure of the backlight module of the double-side display device in the first embodiment of the present invention.

The second fixing part 200 includes a second connection portion 210 and a second carrying portion 220 which are formed integrally. One side of the second carrying portion 220 opposite to the first carrying portion 120 is used for carrying the light guide plate 820, the other side of the second carrying portion 220 is provided with a second slot 221. The second slot 221 is used for attaching with the slide-preventing tape 710 for the liquid crystal module. Between the second connection portion 210 and the second carrying portion 220, a blocking portion 230 is provided. With combined reference to FIG. 6, and FIG. 6 is schematic side view of an assembly structure of the fixing structure of the backlight module of the double-side display device in the first embodiment of the present invention. A side surface of the blocking portion 230 is used for blocking the liquid crystal module 700, a top surface is used for fixing and connecting a frame 1000 of the display device, the frame 1000 surrounds the fixing structure and an outer periphery of the liquid crystal module 700.

The third fixing part 300 includes a third main body portion 310, a third carrying portion 320 and a third connection portion 330 which are formed integrally. Wherein, the third connection portion 330 is used for fixing and connecting with the first fixing part 100.

The third carrying portion 320 includes two third supporting plates 321 extended out from a same side surface of the third main body portion 310. The two third supporting plates 321 and the third main body portion 310 commonly form a third U-shaped fixing slot 808 for the light guide plate 820. Outer sides of the two third supporting plates 321 are respectively provided with third slots 3211. Each third slot 3211 is used for attaching with the slide-preventing tape 710 for the liquid crystal module. In the present embodiment, the third connection portion 330 is a through hole which has a same extension direction axially as the third U-shaped fixing slot 808, and can be connected with the first fixing part 100 or other fixing parts through a screw bolt.

An integral fixing unit (formed by the first fixing part 100 and the second fixing part 200) cooperates with the third fixing part 300 to realize a fixing to the backlight module 800. The first carrying portion 120, the second carrying portion 220 and the third carrying portion 320 are used for carrying the light guide plate 820 of the backlight module 800 respectively at different locations.

The fourth fixing part 400 includes a fourth main body portion 410, a fourth carrying portion 420 and a fourth connection portion 430 which are formed integrally. The fourth connection portion 430 is used for fixing and connecting with the first fixing part 100 or the third fixing part 300. The fourth fixing part 400 can cooperate with the integral fixing unit and the third fixing part 300 to realize the fixing for the backlight module 800.

The fourth carrying portion 420 includes two fourth supporting plates 421 extended out from a same side surface of the fourth main body portion 410. The two fourth supporting plates 421 and the fourth main body portion 410 commonly form a fourth U-shaped fixing slot 809 for the light guide plate 820. Outer sides of the two fourth supporting plates 421 are respectively provided with fourth slots 4211. Each fourth slot 4211 is used for attaching with the slide-preventing tape 710 for the liquid crystal modules. The fourth connection portion 430 is a through hole that penetrates through the fourth main body portion 410 and is communicated with the fourth U-shaped fixing slot 809. It can be seen from above structure, the third fixing part 300 and the fourth fixing part 400 can be formed commonly by a set of mold. Only some milling structures (the through hole for connecting) are different. Accordingly, the production cost of the fixing parts is greatly decreased, and not necessary to use a set of mold for each fixing part.

The assembly process of the embodiment 1 is as following: fixing the backlight light bar 810 to the first carrying surface 121 of the first fixing part 100, and fastening the second fixing part 200 on the first fixing part 100 in order to form a U-shaped slot having the backlight light bar 810. At this time, installing the light guide plate 820 into the U-shaped slot (as shown in FIG. 5), then, engaging the third fixing plates 300 to the sides of the light guide plate 820 respectively at left and right sides, and using screws to fasten the third fixing plates 300 at left and right sides to the first fixing part 100. Then, engaging the fourth fixing part 400 at a top to the side of light guide plate 820, and fastening with the third fixing parts 300 at left and right sides through engagement slots or screws to form an integral body. Finally, installing optical film group 600, the liquid crystal module 700 and the frame 1000 at two sides, that is, finishing an ultra-thin double-side liquid crystal display module as shown in FIG. 6.

Embodiment 2

Figure 7:
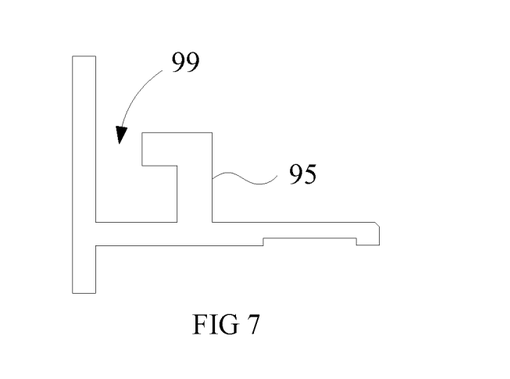
FIG. 7 is a schematic side view of a first fixing part of a second embodiment of a fixing structure of a backlight module of a double-side display device of the present invention.
Figure 8:
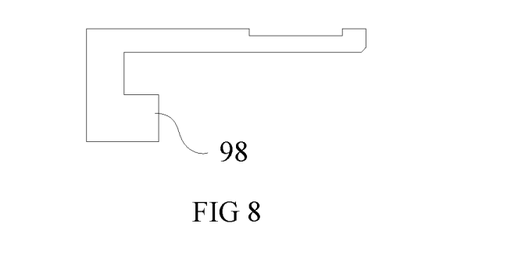
FIG. 8 is a schematic side view of a second fixing part of the second embodiment of the fixing structure of the backlight module of the double-side display device of the present invention.
Figure 9:
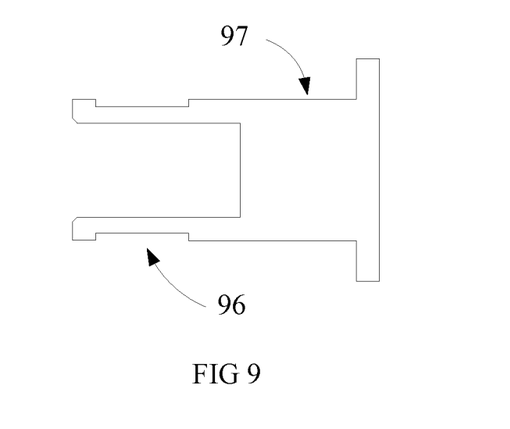
FIG. 9 is a schematic side view of a third fixing part of the second embodiment of the fixing structure of the backlight module of the double-side display device of the present invention.

With combined reference to FIG. 7 to FIG. 9, wherein FIG. 7 is a schematic side view of a first fixing part of a second embodiment of a fixing structure of a backlight module of a double-side display device of the present invention; FIG. 8 is a schematic side view of a second fixing part of the second embodiment of the fixing structure of the backlight module of the double-side display device of the present invention; FIG. 9 is a schematic side view of a third fixing part of the second embodiment of the fixing structure of the backlight module of the double-side display device of the present invention. The fixing structure in the present embodiment includes three fixing parts, the following only describes the difference comparing to the previous embodiment, same structure features are not repeated anymore.

In the present embodiment, a first connection portion of the first fixing part is an L-shaped connection slot 99 provided at the first main body portion, and a structure of a second connection portion is a guiding rib 98 matched with the L-shaped connection slot 99. The guiding rib 98 slides inside the L-shaped connection slot 99 in order to realize a detachable connection between the second fixing part and the first fixing part. Comparing to the embodiment 1, through a matching connection such as the guiding rib and the connection slot, a screw bolt can be omitted such that the structure is simple, and the assembly is easier.

Besides, comparing to the previous embodiment, the connection portion of the third fixing part does not require the screw hole, and only includes a main body portion 97 and a carrying portion 96, the third fixing part can connect with the first fixing part through an engagement method. Wherein, each fixing part in the embodiment 1 and 2 is made of aluminum alloy or plastic material. Preferably, an aluminum alloy material, because the aluminum alloy material has characters of good heat dissipation and good structure strength.

Figure 10:
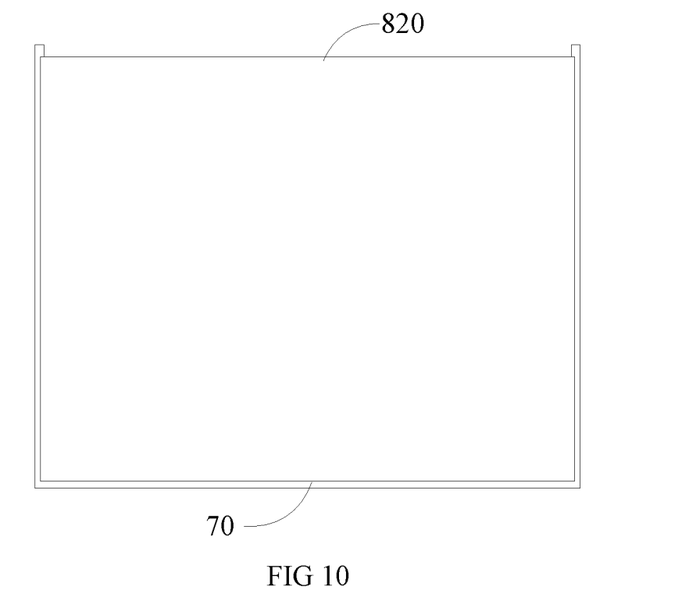
FIG. 10 is a schematic side view of a fourth fixing part of the second embodiment of the fixing structure of the backlight module of the double-side display device of the present invention.
Figure 11:
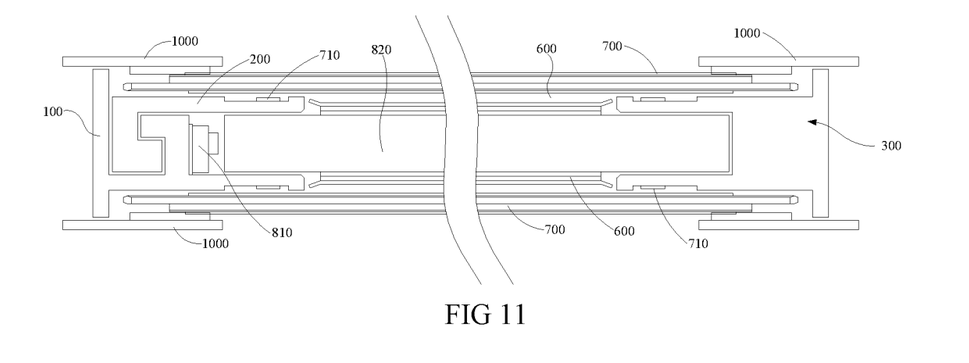
FIG. 11 is schematic side view of an assembly structure of the fixing structure of the backlight module of the double-side display device in the second embodiment of the present invention.

The assembly process of the embodiment 2 is as following: after assembling the backlight light bar 810 on the carrying surface 95 of the first fixing part, three first fixing parts which are made by a same mold (that is, the structures are the same) are connected to form one U-shaped frame 70 through specific connection methods (such as engagement method or screw bolt connection and so on). With combined reference to FIG. 10 and FIG. 11, FIG. 10 is a schematic side view of a fourth fixing part of the second embodiment of the fixing structure of the backlight module of the double-side display device of the present invention, and FIG. 11 is schematic side view of an assembly structure of the fixing structure of the backlight module of the double-side display device in the second embodiment of the present invention. The structure of the U-shaped frame 70 can realize the carrying and limitation of the light guide plate 820. Then, using the second fixing part to assemble along with the L-shaped connection slot 99 through the guiding rib 98. Finally, using the third fixing part 300 to connect the U-shaped frame 70, and adding the optical film group 600, the liquid crystal module 700 and the frame 1000 to finish the assembly of the entire double-side display liquid crystal module.

Comparing to the conventional art, the present invention provides a double-side display device and a fixing structure of a backlight module of the same, the fixing to the backlight module can be realized through multiple fixing parts which is simple in structure, and the assembly process is simple; then, through disposing optical film group and the liquid crystal module respectively at two sides of the backlight module, the double-side display device which is light and thin in volume is formed such that the double-side display device can be thinning. Besides, the different parts of the fixing structure are made partially utilizing a same mold; the production cost of the fixing parts can be decreased.

Figure 12:
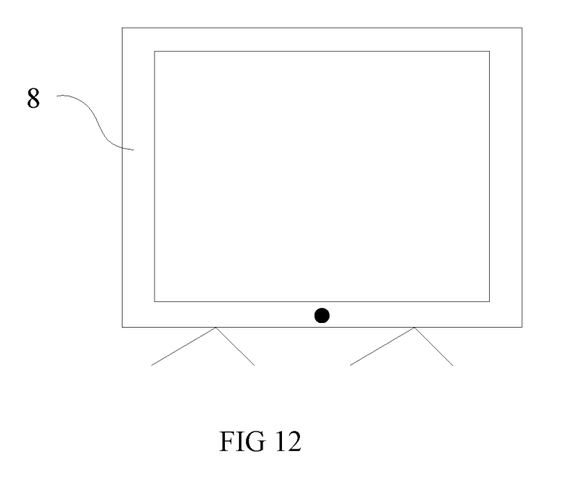
FIG. 12 is a schematic diagram of a preferred embodiment of the double-side display device of the present invention.

Furthermore, the embodiment of the present invention also provides a double-side display device, please refer to FIG. 12, and FIG. 12 is a schematic diagram of a preferred embodiment of the double-side display device of the present invention. Wherein, the double-side display device includes a case 8 and the liquid crystal module, the backlight module, the optical film group and the fixing structure for the backlight module in the above embodiment inside the case 8. Wherein, the optical film group is attached at two sides of the light guide plate of the backlight module, a periphery of the light guide plate is fixed through the fixing structure, outer sides of carrying portions of the fixing structure are connected with and supporting the liquid crystal module. The detail technology features among the fixing structure for the backlight module, the liquid crystal module, the backlight module and the optical film group can refer to the related description of the above embodiment. The other structural technology features, in the field that can be understood by the person skilled in the art, not repeating anymore.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A fixing structure for a backlight module of a double-side display device, comprising:
a first fixing part including a first main body portion, a first carrying portion and a first connection portion which are formed integrally;
a second fixing part including a second connection portion and a second carrying portion which are formed integrally, the second connection portion is detachably connected with the first connection portion; and
a third fixing part including a third main body portion, a third carrying portion and a third connection portion which are formed integrally, wherein the third connection portion is used for fixing and connecting with the first fixing part;
wherein the first fixing part and the second fixing part are connected to form an integral fixing unit, the integral fixing unit cooperates with the third fixing part to realize the fixing for a backlight module, and the first carrying portion, the second carrying portion, the third carrying portion are used for carrying the light guide plate of the backlight module respectively at different locations;
wherein the first carrying portion includes a first carrying surface and a first supporting plate extended out from and perpendicular to a terminal of the first carrying surface; the first carrying surface is used for attaching with a backlight light bar, one side of the first supporting plate closed to the first carrying surface is used for carrying a light guide plate, and the other side of the first supporting plate is used for supporting a liquid crystal module; and
wherein the first connection portion of the first fixing part is an L-shaped connection slot provided at the first main body portion, and a structure of the second connection portion matches with the L-shaped connection slot, the second connection portion slides inside the L-shaped connection slot in order to realize a detachable connection between the second connection portion and the first connection portion.

2. The fixing structure according to claim 1, wherein the fixing structure further includes a fourth fixing part including a fourth main portion, a fourth carrying portion and a fourth connection portion which are formed integrally; the fourth connection portion is used for fixing and connecting with the first fixing part or the third fixing part; the fourth fixing part cooperates with the integral fixing unit and the third fixing part to realize the fixing for the backlight module.

3. The fixing structure according to claim 2, wherein the fourth carrying portion includes two fourth supporting plates extended out from a same side surface of the fourth main body portion; the two fourth supporting plates and the fourth main body portion commonly form a fourth U-shaped fixing slot for the light guide plate; outer sides of the two fourth supporting plates are respectively provided with fourth slots; each fourth slot is used for attaching with the slide-preventing tape for the liquid crystal module; the fourth connection portion is a through hole that penetrates through the fourth main body portion and is communicated with the fourth U-shaped fixing slot.

4. The fixing structure according to claim 1, wherein the side of the first supporting plate used for supporting the liquid crystal module is provided with a first slot, and the first slot is used for attaching with a slide-preventing tape of the liquid crystal module.

5. The fixing structure according to claim 1, wherein the first connection portion is a screw hole provided on the first main body portion; the second connection portion includes a second through hole, a screw bolt passes through the second through hole and cooperates with the screw hole on the first connection portion such that the first connection portion and the second connection portion are fixed and connected.

6. The fixing structure according to claim 1, wherein one side of the second carrying portion opposite to the first carrying portion is used for carrying the light guide plate, the other side of the second fixing part is provided with a second slot, the second slot is used for attaching with the slide-preventing tape for the liquid crystal module.

7. The fixing structure according to claim 1, wherein the third carrying portion includes two third supporting plates extended out from a same side surface of the third main body portion; the two third supporting plates and the third main body portion commonly form a third U-shaped fixing slot for the light guide plate; outer sides of the two third supporting plates are respectively provided with third slots; each third slot is used for attaching with the slide-preventing tape for the liquid crystal module.

8. A double-side display device, wherein the double-side display device includes a liquid crystal module, a backlight module, an optical film group and a fixing structure for the backlight module; the optical film group is attached at two sides of a light guide plate of the backlight module, a periphery of the light guide plate is fixed through the fixing structure, outer sides of carrying portions of the fixing structure are connected with and supporting the liquid crystal module; and the fixing structure comprises:
 a first fixing part including a first main body portion, a first carrying portion and a first connection portion which are formed integrally;
 a second fixing part including a second connection portion and a second carrying portion which are formed integrally, the second connection portion is detachably connected with the first connection portion; and
 a third fixing part including a third main body portion, a third carrying portion and a third connection portion which are formed integrally, wherein the third connection portion is used for fixing and connecting with the first fixing part;
 wherein, the first fixing part and the second fixing part are connected to form an integral fixing unit, the integral fixing unit cooperates with the third fixing part to realize the fixing for a backlight module, and the first carrying portion, the second carrying portion, the third carrying portion are used for carrying the light guide plate of the backlight module respectively at different locations;
 wherein the first carrying portion includes a first carrying surface and a first supporting plate extended out from and perpendicular to a terminal of the first carrying surface; the first carrying surface is used for attaching with a backlight light bar, one side of the first supporting plate closed to the first carrying surface is used for carrying a light guide plate, and the other side of the first supporting plate is used for supporting a liquid crystal module; and
 wherein the first connection portion of the first fixing part is an L-shaped connection slot provided at the first main body portion, and a structure of the second connection portion matches with the L-shaped connection slot, the second connection portion slides inside the L-shaped connection slot in order to realize a detachable connection between the second connection portion and the first connection portion.

9. The double-side display device according to claim 8, wherein the fixing structure further includes a fourth fixing part including a fourth main portion, a fourth carrying portion and a fourth connection portion which are formed integrally; the fourth connection portion is used for fixing and connecting with the first fixing part or the third fixing part; the fourth fixing part cooperates with the integral fixing unit and the third fixing part to realize the fixing for the backlight module.

10. The double-side display device according to claim 9, wherein the fourth carrying portion includes two fourth supporting plates extended out from a same side surface of the fourth main body portion; the two fourth supporting plates and the fourth main body portion commonly form a fourth U-shaped fixing slot for the light guide plate; outer sides of the two fourth supporting plates are respectively provided with fourth slots; each fourth slot is used for attaching with the slide-preventing tape for the liquid crystal module; the fourth connection portion is a through hole that penetrates through the fourth main body portion and is communicated with the fourth U-shaped fixing slot.

11. The double-side display device according to claim 8, wherein the side of the first supporting plate used for supporting the liquid crystal module is provided with a first slot, and the first slot is used for attaching with a slide-preventing tape of the liquid crystal module.

12. The double-side display device according to claim 8, wherein the first connection portion is a screw hole provided on the first main body portion; the second connection portion includes a second through hole, a screw bolt passes through the second through hole and cooperates with the screw hole on the first connection portion such that the first connection portion and the second connection portion are fixed and connected.

13. The double-side display device according to claim 8, wherein one side of the second carrying portion opposite to the first carrying portion is used for carrying the light guide plate, the other side of the second fixing part is provided with a second slot, the second slot is used for attaching with the slide-preventing tape for the liquid crystal module.

14. The double-side display device according to claim 8, wherein the third carrying portion includes two third supporting plates extended out from a same side surface of the third main body portion; the two third supporting plates and the third main body portion commonly form a third U-shaped fixing slot for the light guide plate; outer sides of the two third supporting plates are respectively provided with third slots; each third slot is used for attaching with the slide-preventing tape for the liquid crystal module.

15. A fixing structure for a backlight module of a double-side display device, comprising:
 a first fixing part including a first main body portion, a first carrying portion and a first connection portion which are formed integrally;
 a second fixing part including a second connection portion and a second carrying portion which are formed integrally, the second connection portion is detachably connected with the first connection portion; and
 a third fixing part including a third main body portion, a third carrying portion and a third connection portion which are formed integrally, wherein the third connection portion is used for fixing and connecting with the first fixing part;
 wherein the first fixing part and the second fixing part are connected to form an integral fixing unit, the integral fixing unit cooperates with the third fixing part to realize the fixing for a backlight module, and the first carrying portion, the second carrying portion, the third carrying portion are used for carrying the light guide plate of the backlight module respectively at different locations;
 wherein the fixing structure further includes a fourth fixing part including a fourth main portion, a fourth carrying portion and a fourth connection portion which are formed integrally; the fourth connection portion is used for fixing and connecting with the first fixing part or the third fixing part; the fourth fixing part cooperates with the integral fixing unit and the third fixing part to realize the fixing for the backlight module; and wherein the fourth carrying portion includes two fourth supporting plates extended out from a same side surface of the fourth main body portion; the two fourth supporting plates and the fourth main body portion commonly form a fourth U-shaped fixing slot for the light guide plate; outer sides of the two fourth supporting plates are respectively provided with fourth slots; each fourth slot is used for attaching with the slide-preventing tape for the liquid crystal module; the fourth connection portion is a through hole that penetrates through the fourth main body portion and is communicated with the fourth U-shaped fixing slot.

\* \* \* \* \*